May 31, 1966     G. P. DAVIS ETAL     3,254,253
PHOTO-ELECTRICALLY SENSITIVE DEVICES
Filed Dec. 11, 1961
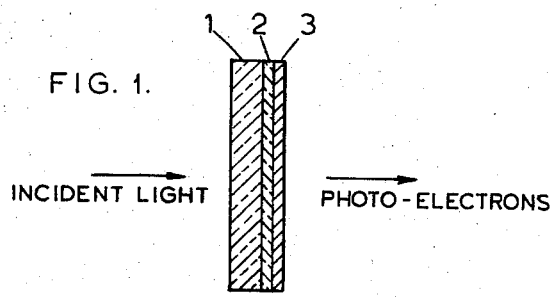
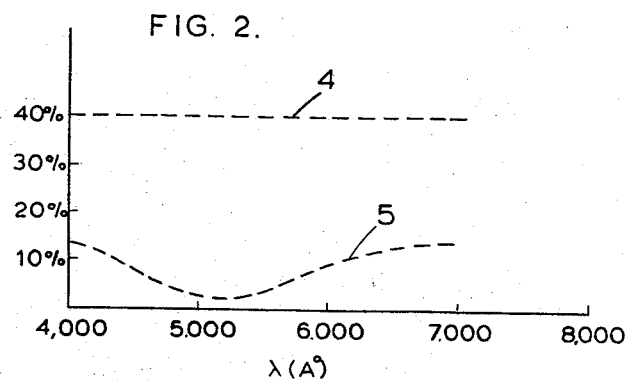
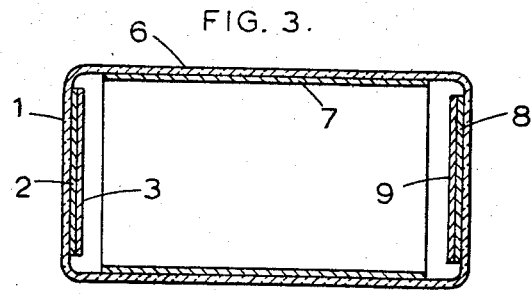

United States Patent Office 3,254,253
Patented May 31, 1966

3,254,253
PHOTO-ELECTRICALLY SENSITIVE DEVICES
Gordon Peter Davis, Sunbury-on-Thames, and Henry Alfred Benbow, Amersham, England, assignors to Electric & Musical Industries Limited, Hayes, England, a company of Great Britain
Filed Dec. 11, 1961, Ser. No. 158,327
Claims priority, application Great Britain, Dec. 14, 1960, 42,941/60
6 Claims. (Cl. 313—102)

This invention relates to photo-electrically sensitive devices in which the sensitive material of the target is supported by a translucent substrate. It relates especially, although not exclusively, to devices having translucent photo-cathodes or targets, for example, photocells, image intensifiers, television camera tubes and photo multipliers.

In devices such as referred to in the preceding paragraph, having translucent photo-cathodes, the efficiency of the photo cathode is considerably reduced by light reflection from the interface between the substrate and the photo emissive layer. It will be understood that in such devices the light is incident on the sensitive layer through the substrate so as to cause electrons to be emitted from the surface of the sensitive layer which is opposite the incident light. Usually, moreover, the substrate is a glass window forming part of the envelope of the device. The amount of light reflection depends to some extent on the material of the sensitive layer, and in some cases it may be as high as 30 to 40 percent of the incident light.

The object of the present invention is to provide an improved photo-electrically sensitive device having a translucent target, with a view to reducing loss of light due to reflection.

According to the present invention there is provided a photo-electrically sensitive device comprising a photo-electrically sensitive layer supported by a translucent substrate through which light may penetrate to the sensitive layer, wherein the sensitive layer is spaced from the substrate by at least one intermediate translucent layer which is such that light reflected from the successive interfaces between the substrate and the layers are at least partially mutually cancelling.

In order that the invention may be clearly understood and readily carried into effect, the invention will be described with reference to the accompanying drawings, in which:

FIGURE 1 illustrates one example of a photo emissive cathode according to the present invention, FIGURE 2 is a graph which will be referred to in the description of FIGURE 1, and FIGURE 3 illustrates an image intensifier embodying a photo-emissive cathode such as illustrated in FIGURE 1.

Referring to the drawing, reference 1 indicates the glass window of a photo-electrically sensitive device which in the present example will be assumed to be an image intensifier. On the inside of the window there is deposited firstly an intermediate anti-reflection film or layer 2 and secondly a photo emissive layer 3 constituting the sensitive layer of the cathode. Incident light is projected on to the sensitive layer 3 through the substrate layer 1 and the intermediate layer 2.

In the example of the invention being described, the cathode is formed by evaporating a layer of titanium in vacuo onto a glass disc which is to form the window. The glass disc is then baked to a temperature between 300° C. and 500° C. in air and sealed into a tube which is to form the envelope of the device. In practice, the baking and sealing may be carried out as a single operation as the purpose of the baking is to oxidize the titanium, and the temperature necessary to seal the window into the glass tube will automatically oxidize the titanium. The oxidization process converts the titanium to titanium dioxide, and the amount of titanium deposited during the evaporation step is controlled, using known techniques, to cause the resultant layer of titanium dioxide to have a thickness which will produce maximum cancellation of reflected light of a particular wavelength. For example to give maximum reduction of reflection at about 5,000 A., the titanium dioxide layer is arranged to have a thickness of 480 A. The material of the sensitive layer 3 is then deposited in well known manner. For example, assuming an antimony-alkali metal layer, the envelope of the device is evacuated, antimony is evaporated onto the titanium dioxide layer until the light transmission is reduced to about 80 percent, and the antimony is then activated by cesium or other alkali metal in well known manner.

In operation of the device, light incident on the window 1 suffers a small loss by reflection but this loss is generally negligible. However, a substantial proportion of the light transmitted through the glass window 1 tends to be reflected at the interface between the window and intermediate layer 2, and a further substantial proportion of the light tends to be reflected at the interface between the intermediate layer 2 and the sensitive layer 3. However, the reflection coefficients, and the thickness and the refractive index of the intermediate layer are chosen to be such that light reflected from the one interface and light reflected from the other interface are substantially mutually cancelling, for light of said particular wavelength. This is achieved in known manner by arranging that twice the thickness of the layer 2 is equal to one half of said particular wavelength in the material of the intermediate layer. By this expedient, it has been found that an improvement of 25 to 35 percent of the amount of light transmitted to the sensitive layer 1 is achieved at a particular wavelength. The improvement is illustrated in FIGURE 2 in which the line 4 represents the amount of reflection, in the absence of the intermediate layer 2, whereas the line 5 represents the amount of reflection when the layer 2 is used.

The invention is not restricted to particular compositions of the anti-reflecting layer and the sensitive layer. In the general case the anti-reflecting layer should have a thickness of approximately $\lambda/4\mu$ where $\lambda$ is the wavelength in vacuo of light for which it is desired to obtain maximum cancellation of reflections and $\mu$ is the refractive index of the layer. The thickness of the anti-reflection layer may be selected to give maximum reduction of reflection at a wavelength for which it is desired to inhance the sensitivity of the target. Moreover, the anti-reflection layer should desirably be transparent or at most should cause insignificant light absorption. Moreover, the reflection coefficients at the two interfaces are such that the amplitude of the reflected light at the interface between the substrate and the anti-reflection layer should be equal to that of the reflected light at the interface between the anti-reflection layer and the sensitive layer. Furthermore, the anti-reflection layer should be of material which will not contaminate the sensitive layer and conversely is not adversely affected by the material of the sensitive layer. Furthermore, the anti-reflection layer should have a low vapor pressure at the temperature required for outgassing the device.

To produce substantially equal amplitudes of the reflected light at the two interfaces, the refractive index of the anti-reflection layer should be approximately equal to the geometric mean of the refractive indices of the substrate 1 and the photo-emissive layer 3, on the assumption that there is no reflection from the layer 3 other than that due to the step in the refractive index at the interface. In the example of the invention described the refractive index of the antimony-alkali metal layer is about 5 and that of the glass window is about 1.5. The refractive index of titanium dioxide is about 2.6. Other substances may be used instead of titanium dioxide for the anti-reflection layer, for example titanium nitride may be used.

Substances having refractive indices over a relatively wide range between the refractive indices of the window 1 and the layer 3, the range including said geometric mean, will moreover produce substantial reduction in reflection, provided the substance has the other requisite qualities. Moreover, more than one anti-reflecting layer may be interposed between the window 1 and the layer 3, the refractive indices of such interposed layers being then preferably graded in geometric series or nearly so. Such layers may moreover have selected thicknesses to produce substantial reduction of reflection at different wave lengths.

FIGURE 3 shows a cathode such as illustrated in FIGURE 1 embodied in an image intensifier. The intensifier comprises an envelope 6, of which one end wall is constituted by the window 1 provided with the layers 2 and 3. On the other end wall is deposited a fluorescent screen 8 in which is provided a conductive coating 9, for example of aluminium. The other wall of the envelope 6 supports a conductive acceleration electrode 7.

The invention may be applied to other electron discharge devices, such as photocells, television camera tubes, and photo-multipliers. The layer 3 need not be photoemissive but may be photo-conductive or otherwise photo-electrically sensitive.

What we claim is:
1. A photo-electrically sensitive device comprising a translucent substrate, a photo-electrically sensitive layer, and at least one translucent intermediate layer between the sensitive layer and the translucent substrate, said layers being respectively adherent to the layer beneath and to the translucent substrate, the sensitive layer having a refractive index which is higher than that of the translucent substrate, the at least one translucent intermediate layer having a refractive index which is intermediate the refractive indices of the sensitive layer and the substrate, and the intermediate layer having a thickness which is an odd multiple of a ¼ wave length of light of a particular wave length to which the device is sensitive so that light reflections from the successive interfaces between the substrate and layers are substantially mutually cancelling.

2. A photo-electrically sensitive device according to claim 1 embodied in an electron discharge device and further comprising a surface for receiving electrons from the sensitive layer, said sensitive layer being a photocathode.

3. A photo-electrically sensitive device comprising a translucent substrate, a translucent intermediate layer adherent to one surface of said substrate, and a photo-electrically sensitive layer adherent to said intermediate layer, said intermediate layer being translucent to allow light penetrating through said substrate to reach said sensitive layer, said sensitive layer having a refractive index which is substantially higher than that of said substrate, said intermediate layer having a refractive index which is intermediate the refractive indices of said substrate and said sensitive layer, and the intermediate layer having a thickness which is an odd multiple of a ¼ wave length of light of a particular wave length to which the device is sensitive so that light reflections from the successive interfaces between the substrate and layers are substantially mutually cancelling.

4. A device according to claim 3 wherein said substrate comprises a glass window having substantially planar parallel surfaces, said intermediate layer comprises titanium dioxide and said sensitive layer comprises antimony and alkali metal.

5. A device according to claim 3 in which the refractive index of said intermediate layer is approximately the geometric mean of the refractive indices of said substrate and said layer, so that the amplitude of light reflected from the interface between said substrate and said intermediate layer approximates to the amplitude of light reflected from the interface between said intermediate layer and said sensitive layer.

6. A device according to claim 5 wherein the refractive index of said sensitive layer is about 5, the refractive index of said substrate is about 1.5 and the refractive index of said intermediate layer is about 2.6.

References Cited by the Examiner
UNITED STATES PATENTS

| 2,676,282 | 4/1954 | Polkosky | 117—217 X |
| 2,756,165 | 7/1956 | Lyon | 117—211 |
| 2,771,055 | 11/1956 | Kelly et al. | 117—106 X |

FOREIGN PATENTS

| 702,824 | 1/1954 | Great Britain. |
| 765,480 | 1/1957 | Great Britain. |

RICHARD D. NEVIUS, *Primary Examiner.*